United States Patent [19]
Jenkins

[11] Patent Number: 4,854,731
[45] Date of Patent: Aug. 8, 1989

[54] TEMPERATURE SENSING APPARATUS
[75] Inventor: James O. M. Jenkins, Swansea, United Kingdom
[73] Assignee: Siliconix Limited, Wales, United Kingdom
[21] Appl. No.: 80,890
[22] Filed: Aug. 3, 1987
[30] Foreign Application Priority Data Aug. 18, 1986 [GB] United Kingdom ............... 8620031
Jun. 19, 1987 [GB] United Kingdom ............... 8714380

[51] Int. Cl.[4] ........................ G01K 7/00; G01K 7/22
[52] U.S. Cl. .................................... 374/178; 307/310; 374/183
[58] Field of Search ............... 374/178, 183; 340/598, 340/595; 361/388; 307/310; 357/28

[56] References Cited
U.S. PATENT DOCUMENTS

| 3,182,201 | 5/1965 | Sklar | 307/310 |
|---|---|---|---|
| 3,440,883 | 4/1969 | Lightner | 374/172 |
| 3,566,690 | 3/1971 | Ebrahimi | 374/178 |
| 3,934,476 | 1/1976 | Lamb II | 374/178 X |
| 4,003,038 | 1/1977 | Meijer | 340/598 |
| 4,184,126 | 1/1980 | Jaskolski et al. | 340/598 X |
| 4,331,888 | 5/1982 | Yamauchi | 340/598 |
| 4,549,818 | 10/1985 | Nishikubo et al. | 374/178 |
| 4,689,659 | 8/1987 | Watanabe | 357/28 X |

Primary Examiner—Daniel M. Yasich
Attorney, Agent, or Firm—Roylance, Abrams, Berdo & Goodman

[57] ABSTRACT

It is desirable to be able to sense the temperature of a semiconductor element to detect, for example, overheating of that element. A temperature sensing apparatus is disclosed which comprises a polysilicon device, functioning as a temperature transducer and integrated with a semiconductor element. A silicon oxide layer separates the temperature transducer device from the element.

9 Claims, 1 Drawing Sheet

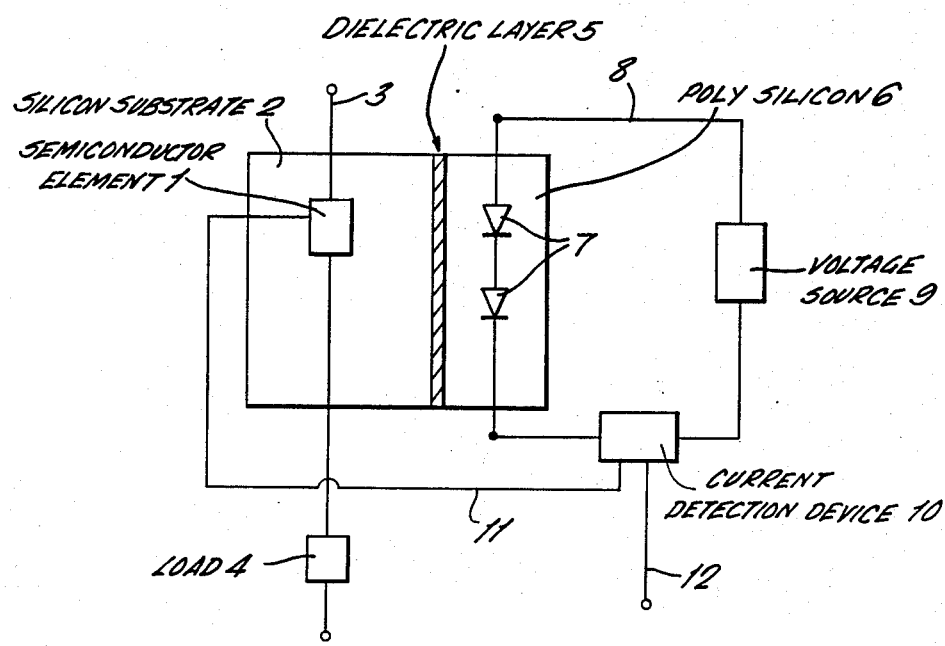

TEMPERATURE SENSING APPARATUS

FIELD OF THE INVENTION

This invention relates to temperature sensing apparatus, and in particular to temperature sensing apparatus comprising at least one semiconductor device for sensing temperature.

BACKGROUND TO THE INVENTION

It is desirable to be able to sense the temperature of a semiconductor element for a variety of purposes. For instance, it is a problem with many sorts of semiconductor element that overheating of the element may, if prolonged, lead to the destruction of that element. By way of example, any MOS (metal oxide semiconductor) switch has a limit to its capability to dissipate power which, if exceeded, may result in the overheating and self-destruction of the MOS switch. The power dissipated by a switch is the product of the voltage across the switch and the current through the switch: the switch is normally used in conjunction with a load which, under normal operating conditions, limits the current through the switch and the voltage across it to a value within the power dissipation capability of the switch. Should the load be inadvertently short circuited, the total supply voltage will be across the switch which may result in the power dissipation capability being exceeded with consequent overheating and destruction of the switch.

BRIEF SUMMARY OF THE INVENTION

According to the present invention, a temperature sensing apparatus comprises a semiconductor element, at least one semiconductor device for sensing the temperature of the semiconductor element, and a means allowing both electrical isolation and thermal contact between the device and the element. The means the device and the element comprising an integrated circuit, and a circuit connected to the device and arranged to provide signal in dependence on the electrical conductivity of the device indicative of the temperature of the element.

Consequently, the temperature of the element, for instance an MOS switch, may be sensed and overheating readily detected. Preferably, the semiconductor device may be integrated in polysilicon and the means providing both electrical isolation and thermal contact may comprise a dielectric layer which may be of silicon nitride and/or silicon dioxide. Consequently, the semiconductor device for sensing temperature may be positioned within a few microns of the element, thus providing a compact and rapidly reacting temperature sensor.

The semiconductor device may consist of essentially a uni-polar junction device. For instance, a polysilicon diode or resistor may be utilised or, alternatively, a MOS transistor fabricated in polysilicon.

Conveniently, the output means may be arranged to provide an output dependent on the current flowing through the device which may constitute an indication that the temperature of the element exceeds a predetermined threshold.

BRIEF DESCRIPTION OF THE DRAWINGS

An example of the invention will now be described with reference to the accompanying drawing in which the sole FIGURE depicts a schematic cross section through a MOS structure having a temperature sensing apparatus in accordance with the present invention.

DETAILED DESCRIPTION

Referring now to the FIGURE, a semiconductor element 1, which may be a MOS switch, the temperature of which is to be sensed, is arranged in a silicon substrate 2. The MOS switch 1 switches current supplied on a conductor 3 to a load 4. Heat is dissipated from the switch 1, when on, to the silicon substrate 2. A thin silicon oxide dielectric layer 5 bounding a portion of the silicon substrate 2 in proximity to the switch 1, allows both electrical isolation and thermal contact between the switch 1 and the semiconductor device 7, which is used for sensing the temperature of the switch 1. The device 7 may comprise a chain of junction devices, 7, integrated in polysilicon 6. In the present example, the chain consists of series connected polysilicon encapsulated diodes 7, of which two are illustrated. A circuit, comprising a voltage source 9, is connected to apply a voltage across the chain of diodes 7 via conductor 8.

A current detection device 10 is arranged to detect current flowing through the devices 7. Current detection device 10 may be, for example, a simple operational amplifier voltage convertor. The voltage source 9 applies a fixed voltage which is below the threshold voltage required to drive the diodes 7 into conduction, under normal operating conditions. The threshold voltage is, however, temperature dependent, and decreases with increasing temperature. Consequently, the diodes 7 will become conducting should sufficient heat from the switch 1 be conducted to the diodes 7. In such circumstances, the current detection device 10 may provide an output signal on conductor 11 to turn off MOS switch 1 by, for example, applying an appropriate bias to the gate of MOS switch 1.

It will be apparent that the precise form of the semiconductor devices 7, the voltage applied by source 9, the proximity of the devices 7 to the switch 1 and the thermal conductivity of the interspaced portion between switch 1 and device 7 are at least some of the factors to be taken into account in arranging for the circuit to provide an output indicative of the temperature of the switch 1, and, in particular, of the overheating of the switch 1 above a predetermined level.

If a semiconductor device is utilized having temperature dependent charge transport properties not characterised by an abrupt conduction threshold, for instance a thermistor, then the temperature sensing apparatus of the invention may be arranged so that the current detection circuit 10 provides an output 12 indicative of the actual temperature of the switch 1, in dependence, for instance upon the amount of current flowing or the voltage applied by voltage source 9. Further, particular arrangements of semiconductor devices 7 may be utilised which are arranged to allow current flow in the circuit only when the devices are below a predetermined temperature.

What is claimed is:

1. Temperature sensing apparatus comprising a substrate, a semiconductor element on the substrate; at least one semiconductor device on the substrate for sensing the temperature of the semiconductor element; and means providing both electrical isolation and thermal contact between the device and the element, the means the device and the element comprising an integrated circuit; and circuit means connected to the device and arranged to provide a signal solely in dependence on the electrical conductivity of the device indicative of the temperature of the element.

2. Temperature sensing apparatus as claimed in claim 1, wherein the means providing both electrical isolation and thermal contact comprises a dielectric layer.

3. Temperature sensing apparatus as claimed in claim 2, wherein the dieletric layer comprises silicon nitride and/or silicon dioxide.

4. Temperature sensing apparatus as claimed in claim 1, wherein the semiconductor device is integrated in polysilicon.

5. Temperature sensing apparatus as claimed in claim 1, wherein the semiconductor device is an unipolar junction device.

6. Temperature sensing apparatus as claimed in claim 5, wherein the unipolar junction device consists of either a diode, a MOS switch or a resistor.

7. Temperature sensing apparatus as claimed in claim 1, wherein the semiconductor element consists essentially of a MOS switch.

8. Temperature sensing apparatus as claimed in claim 7, wherein the circuit further includes gate biasing means for the switch operable to turn off the MOS switch at a predetermined temperature of the switch.

9. Temperature sensing apparatus as claimed in claim 1, wherein the output circuit comprises a voltage source for applying a predetermined voltage.

* * * * *